United States Patent [19]

Winn

[11] Patent Number: 5,160,149
[45] Date of Patent: Nov. 3, 1992

[54] SEAL ROTOR MOUNT

[75] Inventor: Laurence B. Winn, Phoenix, Ariz.

[73] Assignee: Allied-Signal Inc., Morris Township, Morris County, N.J.

[21] Appl. No.: 718,713

[22] Filed: Jun. 21, 1991

[51] Int. Cl.⁵ .............................................. F16J 15/34
[52] U.S. Cl. ...................................... 277/85; 277/22; 277/88; 415/230
[58] Field of Search .................. 277/85, 81 R, 88, 89, 277/22; 415/229, 230, 231

[56] References Cited

U.S. PATENT DOCUMENTS

| 1,363,378 | 12/1920 | Vuilleumier | 277/81 |
|---|---|---|---|
| 2,030,303 | 2/1936 | Kempton | 277/89 |
| 2,089,570 | 8/1937 | Petrelli | 277/81 |
| 2,157,597 | 5/1936 | Dupree, Jr. | |
| 2,173,075 | 8/1937 | Nelson | |
| 2,281,157 | 4/1942 | Kanuch et al. | 277/81 |
| 2,576,721 | 6/1948 | Nelson | |
| 2,740,648 | 9/1952 | Amblard | |
| 2,743,948 | 10/1952 | Heinrich | |
| 2,776,851 | 1/1957 | Heinrich | |
| 2,961,258 | 11/1960 | Donley et al. | |
| 3,269,738 | 8/1966 | Baumler | 277/81 |
| 4,365,816 | 12/1982 | Johnson et al. | |
| 4,378,119 | 3/1983 | Luxford et al. | |
| 4,614,368 | 9/1986 | Couilahn | 277/22 |

FOREIGN PATENT DOCUMENTS

| 900765 | 11/1953 | Fed. Rep. of Germany | |
| 2132622 | 1/1972 | Fed. Rep. of Germany | |
| 0812046 | 4/1959 | United Kingdom | 277/89 |
| 2082692A | 3/1982 | United Kingdom | |

Primary Examiner—William A. Cuchlinski, Jr.
Assistant Examiner—Daniel G. DePumpo
Attorney, Agent, or Firm—James W. McFarland; Robert A. Walsh

[57] ABSTRACT

A rotary seal is affixed to an adjacent rotating shaft through a thin foil axially clamped to the shaft. The relative configuration and arrangement assures that any distortional producing clamping forces resulting from manufacturing imperfections are not transmitted to the sealing face of the rotating seal.

20 Claims, 2 Drawing Sheets

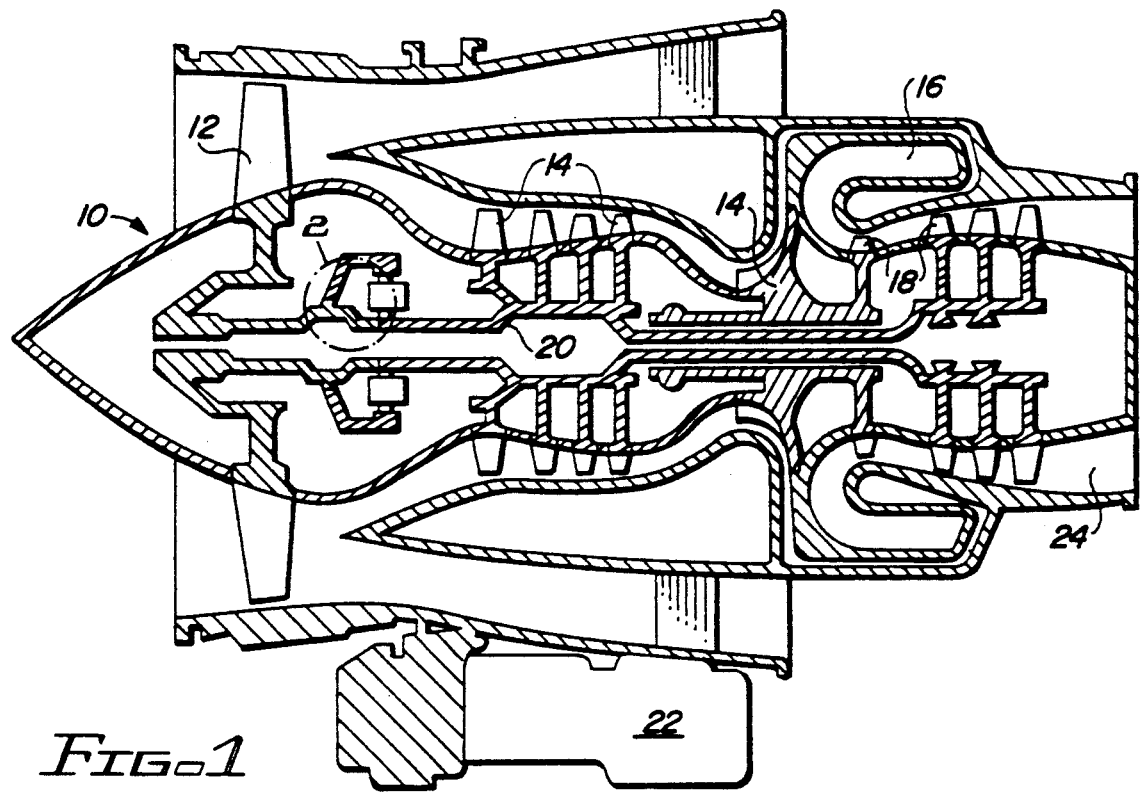
FIG-1
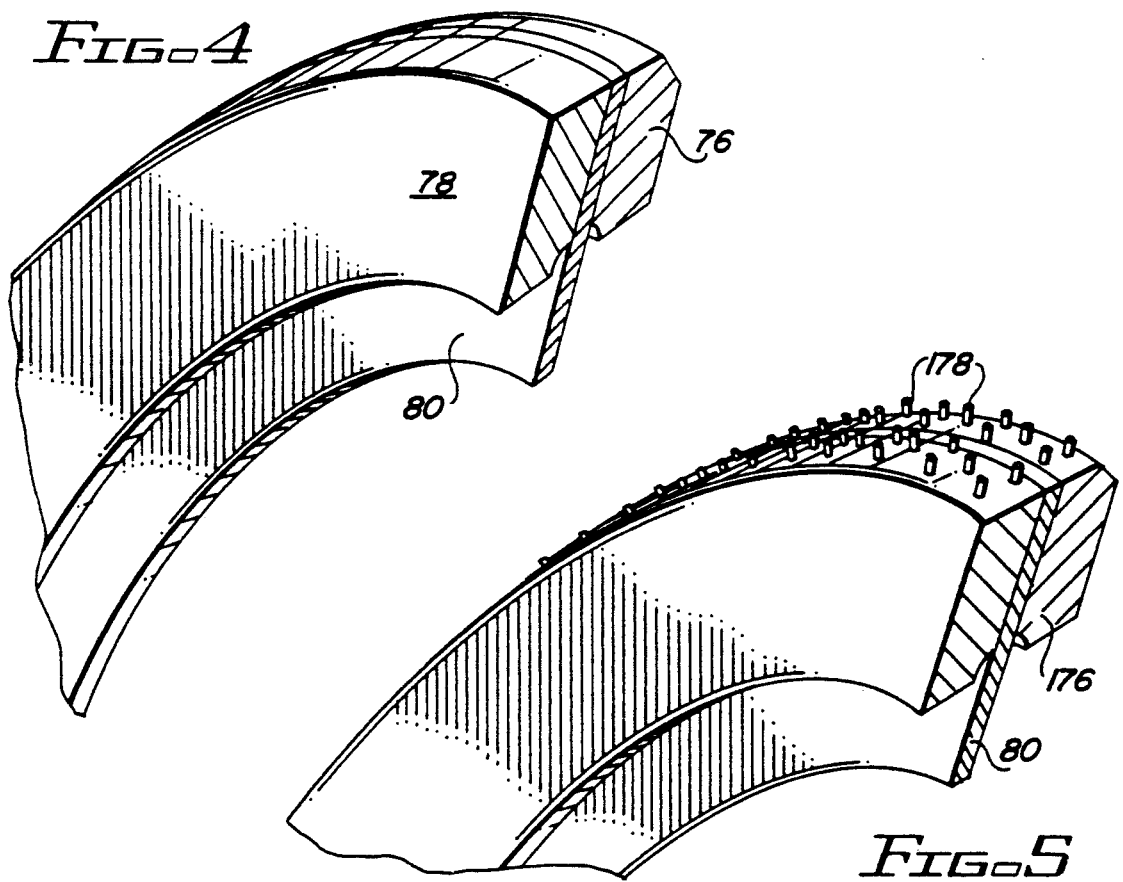
FIG-4
FIG-5

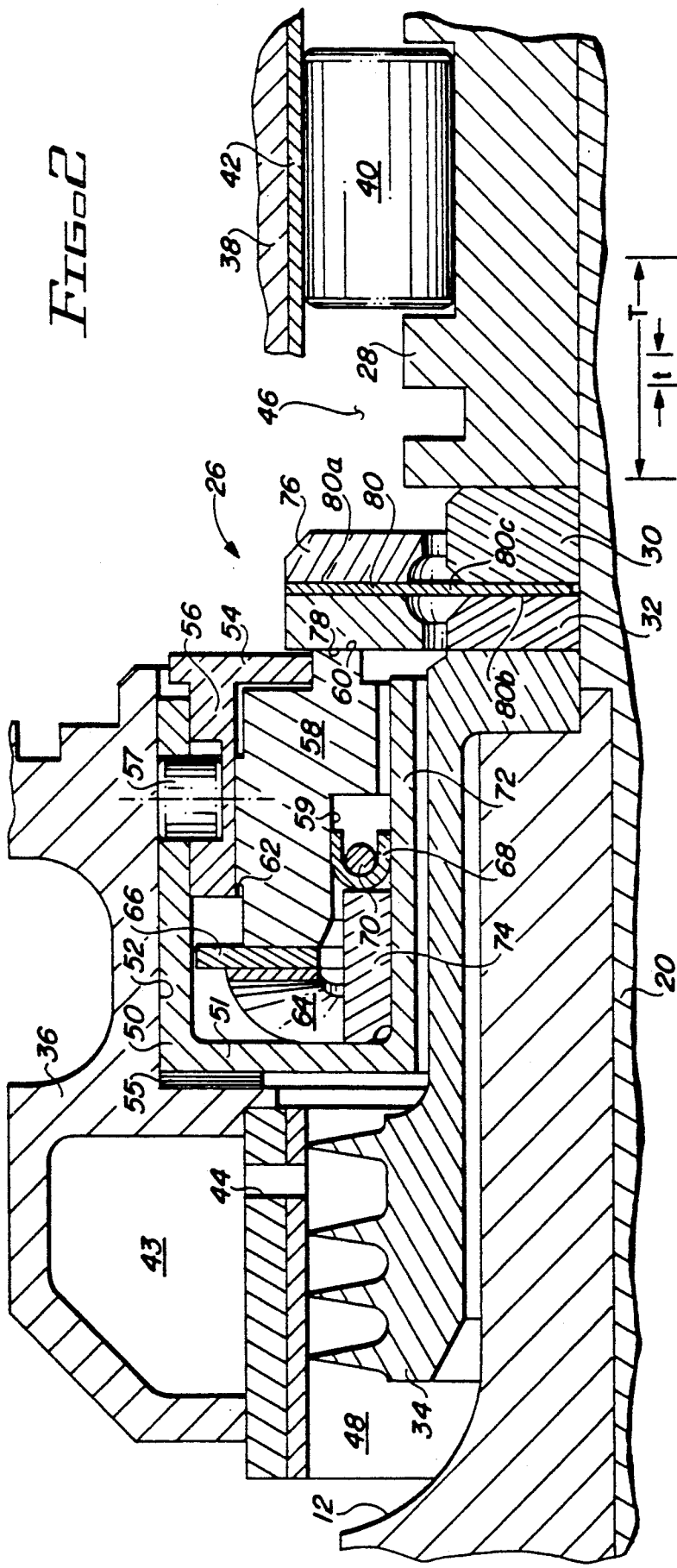

SEAL ROTOR MOUNT

BACKGROUND OF THE INVENTION

This invention pertains to sealing arrangements for rotating mechanisms, and relates more particularly to an improved mounting configuration for the rotating portion of a seal as utilized in high temperature, high speed turbo-machinery.

Certain sealing arrangements for rotating elements such as high speed rotary shafts, include rotating and non-rotating sealing elements which have relatively rotating surfaces in sealing interengagement. The rotating portion of the seal, herein referred to as a seal rotor, is secured for rotation with the rotating element, while the nonrotating sealing element is typically affixed to the surrounding housing to which the rotating shaft may be journaled.

Care must be taken in securing the seal rotor to the rotating element to maintain an effective sealing interengagement with the nonrotating portion of the seal. While in many applications the problem can be approached by utilization of a "soft mount" such as an elastomeric seal configuration, such is not applicable to certain situations particularly wherein very high temperatures and other extreme operational environments occur. This is characteristic, for example, of gas turbomachinery wherein soft mount members such as elastomerics are not capable of withstanding the harsh environment. Other prior art arrangements such as utilization of resilient mounts oftentime require extensive axial space.

A particular problem of the nature described is a tendency towards distortion of the sealing face of the seal rotor as a result of the forces required to secure the seal rotor to the rotating shaft. Some sources of such distortion are the manufacturing imperfections associated with the mounting structure securing of the seal rotor to the shaft. For example, in a gas turbine engine the substantial axial clamping force, on the order of many thousands of pounds per square inch, can induce waviness or other non-axisymmetric distortions into the sealing face of the seal rotor by virtue of the transmittal of the clamping force from the necessarily imperfectly manufactured clamping mechanism into the seal rotor itself.

SUMMARY OF THE INVENTION

Accordingly, it is an important object of the present invention to provide improved mounting structure for a rotating seal rotor having a flat sealing face, wherein the mounting arrangement substantially eliminates transmittal of distortional forces, generated in securing the seal rotor to its driving mechanism, to the seal rotor face.

Another important object of the present invention is to eliminate such transmittal of distortional clamping forces by utilization of a securement mechanism having significantly less axial stiffness than the axial stiffness of the seal rotor itself.

A more particular object is to include a radially inwardly extending, annular foil construction having significantly less axial thickness than the seal rotor, with an inner portion of the foil being compliantly clamped onto the shaft in such a manner that the distortional clamping forces are not transmitted to the seal rotor.

More particularly the present invention contemplates a seal arrangement having a nonrotating carbon ring affixed to the housing with a flat, radially extending sealing face. A rotatable seal rotor is disposed adjacent the carbon ring and has a flat annular sealing face which is in rotating, sealing interengagement with the sealing face of the carbon seal. A washer-like foil extends radially inwardly from the axial mid-point of the seal rotor and has an inner portion which is axially clamped onto the shaft. The mounting foil is relatively compliant with relatively low axial stiffness such that it distorts as necessary to conform with any manufacturing tolerances of the clamping components rather than transmitting the distortional forces into the body of the seal rotor itself. Preferably, the mounting foil has an unclamped portion extending between the seal rotor and the rotating shaft whose aspect ratio of radial length to axial thickness is between about 6 and about 10. Then, by utilization of a seal rotor whose axial thickness is many times greater than the axial thickness of the foil, distortion of the sealing face of the seal rotor is eliminated.

These and other objects and advantages of the present invention are specifically set forth in or will become apparent from the following detailed description of the preferred embodiment of the invention when read in conjunction with the accompanying drawings.

BRIEF DESCRIPTION OF THE DRAWINGS

FIG. 1 is a partially schematic, cross-sectional plan view of a gas turbine engine incorporating the present invention;

FIG. 2 is an enlarged plain cross-sectional view of the area circumscribed by the circle 2 of FIG. 1;

FIG. 3 is an enlarged partial cross-sectional view of the seal rotor and foil mount of the present invention;

FIG. 4 is a partial, perspective view of a segment of the seal rotor and mounting foil; and FIG. 5 is a view similar to FIG. 4 but showing an alternate embodiment of the invention.

DETAILED DESCRIPTION OF THE PREFERRED EMBODIMENT

Referring now more particularly to the drawings, a typical gas turbine engine 10 includes a rotating fan 12 and compressors 14 which receive incoming air and compress the latter for delivery to a combustor 16. Hot exhaust gas is directed across one or more turbines 18 to create rotary mechanical power for driving one or more central shafts 20 for powering the fan 12 and compressors 14. Additional useful power may be extracted through a gear box 22 or by the propulsion thrust created by the exhaust gas flow through outlet 24.

Details of an improved seal configuration 26 associated with rotating shaft 20 are illustrated in FIGS. 2-4. As shown the shaft 20 is driving the central disk of the rotary fan 12 through a splined connection. Secured to and rotating with the shaft 20 and fan disk 12 are a bearing carrier 28, spacers 30 and 32, and a conventional metallic knife seal 34. Components 28, 30, 32 and 34 are rigidly secured for rotation with shaft 20 and fan disk 12, and a significant axial clamping force of 45,000 pounds per square inch forces spacers 30 and 32 toward one another in a conventional fashion such as by utilization of a tie shaft arrangement. For purposes of this invention the intersecured rotating element 12, 20 and 28, 30, 32 and 34 may be viewed as a unitary shaft assembly, or simply referred to as the shaft.

Stationary structure illustrated in FIG. 2 includes a housing 36 and another housing 38. A roller bearing 40 rotatably mounts shaft 22 of the housing structure 38 through the bearing carriers 28 and 42. Buffered, pressurized air may be transmitted from a passage 43 in housing 36 through opening 44 to the knife edge seal 34 and surrounding passageways for cooling and/or lubrication purposes.

Seal assembly 26 fluidly isolates the zones 46, 48 which are axially spaced along shaft 20. Seal assembly 26 includes an annular cup 50 press fit into an annular wall 52 of housing 36. Shims 55 axially space the cup 50. An annular washer 54 acts as a retainer and includes one or more anti-rotation lugs 56 which extend axially inside cup 50. A radial pin 57 prevents rotation of retainer 54. The seal assembly further includes a carbon seal ring 58 of annular configuration and having a radially extending, ring-like sealing face 60 at the rightward end of carbon ring 58 as viewed in FIG. 2. The annular carbon ring 58 includes one or more radially upstanding lands 62 that are slidably received within associated slots in the anti-rotation lugs 56 of the retainer 54. In this manner it will be appreciated that pin 57 acts through lugs 56 to secure the carbon ring 58 against rotation but allows axial motion of ring 58. Carbon ring 58 is biased rightwardly in FIG. 2 by a wave spring 64 extending between end wall 51 of cup 50 and a washer 66. Preferably, the seal assembly 26 includes a C-shaped secondary metal seal 68 with associated spring 70 therewithin to effectively seal between an inner diameter 59 of the carbon ring 58 and an inner wall 72 of cup 50. A backup ring 74 extends between the wall 51 of cup 50 and the secondary seal 68.

Seal assembly 26 further includes a rotating member in the form of an annular seal rotor 76 of circular, ring-like configuration with a flat, radially extending annular sealing face 78 arranged to sealing engage and rotate against sealing face 60 of carbon ring 58. Extending radially inwardly from the approximate axial midpoint of the seal rotor 76 is an annularly shaped, washer-like, compliant drive ring or foil 80. Foil 80 is preferably of the same steel material as seal rotor 76 such as Inconel 718 or 750 or Carpenter 440C. The radially outer portion 80a of foil 80 is affixed to seal rotor 70 such as by brazing or hipping (hot isostatic pressing) the opposed radial faces of foil 80 to the adjacent halves of the seal rotor 76. A radially inner portion 80b of foil 80 is rigidly, axially clamped between the spacers 30, 32.

As clearly illustrated in FIG. 3, between the radially outer portion 80a of the foil which is affixed to the seal rotor 76, and the radially inner portion 80b of the foil which is clamped between the spacers 30, 32, the foil further includes a radially intermediate portion 80c extending between the inner and outer portions. The radial length of portion 80c is the difference between the radii: $r_2 - r_1$. This intermediate portion 80c is unclamped. Importantly, the axial thickness "t" of foil 80 is significantly less than the axial thickness "T" of the seal rotor 76. Preferably, the ratio of axial thicknesses T/t is on the order of about 15 to 20. Further, the ratio of the radial length of the unclamped intermediate portion 80c to the thickness t of the foil is between about 6 and 10, i.e. $(r_2-r_1)/t = 6$ to 10. By such relative formulation and configuration of the depending foil 80 and the seal rotor 76, the axial stiffness of the rotor 76 is significantly greater than that of the mounting foil 80. For example, with a foil thickness t=0.01 inches, and a radial length of unclamped section 80c of 0.08 inches, and an axial thickness T of the seal rotor of about 0.18 inches to 0.20 inches, it has been found that the relative axial stiffness of the seal rotor 76 in comparison to the foil 80 will allow the foil 80 to compliantly deform and/or distort as necessary to conform to any manufacturing tolerance buildups or irregularities between the spacers 30 and 32, all without transmitting such distortional forces to the seal rotor 76 and the sealing face 78 thereof.

In operation of the gas turbine engine, high speed rotation of shaft 20 and fan disk 12 can generate localized speeds at the mating sealing surfaces 60, 78 on the order of about 200 feet per second or higher. In addition to these high rotational speeds, the ambient temperature in the area of seal rotor 76 can reach 400° F. or higher. To function properly in such extreme environmental conditions, elastomeric or other soft mounting systems for the seal rotor 76 are often times not usable. To maintain an effective seal between the adjacent faces 60, 78 it is critical that the two faces remain in flat, parallel alignment. Because of manufacturing irregularities and/or tolerance buildups, it is virtually impossible to ensure that the adjacent surfaces of the spacer elements 30, 32 can be maintained to the same degree of parallelness and flatness as required between the mating sealing faces 60, 78. The axial clamping forces exerted upon the foil 80 tend to, if transmitted to sealing face 78, create non-axisymmetric variations in the face 78 in the form of waving or warping around the circumferential extent of the face 78. In this respect it is important to note that the seal rotor 76 and the foil 80 are each of continuous cylindrical configuration without direct circumferential stress relief therein should such warping forces be transmitted thereto. The present invention substantially eliminates transmittal of such clamping or securing forces to the sealing face 78 by virtue of the relatively thin, radially inwardly extending foil 80. In response to such variations in manufacturing the foil 80 may distort or compliantly deform under the localized stresses induced by the manufacturing irregularities, all without transmittal of such localized stresses onto the seal rotor itself.

At the same time, foil 80 acts to effectively seal the space between seal rotor 76 and the shaft 20 to fluidly separate zone 46 from zone 48. Additionally foil 80, due to its relatively low axial stiffness, will tend to assist the spring action in maintaining surfaces 78 and 60 in appropriate sealing contact.

Foil 80 is preferably located at approximately the axial midpoint of the seal rotor 76 to minimize coning or dishing of the seal rotor 76 and its associated face 78 which would otherwise be caused by the centrifugal forces exerted thereon should the rotor 76 be constrained by the foil 80 at one axial end of rotor 76. While coning or dishing of the seal rotor 76 is to be avoided, such is an axisymmetric variation which will be ultimately compensated for by wear on the mating faces of 60 and 78.

In addition to the substantial mechanical isolation of the seal rotor from the shaft 20 as afforded by the thin foil 80, this arrangement also tends to thermally isolate the seal rotor 76 from the relatively large heat sink presented by shaft 20 and its associated elements. Accordingly care must be taken in the selection of materials for seal rotor 76 to minimize development of an axial thermal gradient within seal rotor 76 which tends to promote coning or dishing thereof. In this respect it will be apparent that the rubbing action between faces 60 and 78 constitute a heat source which may create an axial thermal gradient across seal rotor 76.

FIG. 5 illustrates an alternative embodiment to reduce the tendency of buildup of an axial thermal gradient by incorporation of an alternative seal rotor 176 constructed like that discussed above with respect to FIGS. 2–4, with the exception that heat exchange pins 178 protrude radially outwardly from seal rotor 176. Acting as heat sinks, such pins will tend to dissipate heat buildup in the seal rotor by creating an increased radial thermal gradient therein to minimize buildup of an axial thermal gradient.

From the foregoing it will be apparent that the depending foil 80 is of sufficient strength to transmit the necessary rotary torque to drive the seal rotor 76, yet is sufficiently thin so as to distort upon clamping in a manner which substantially eliminates transmittal of any of the undesired clamping forces to cause warping or waving of the seal face 78. At the same time the arrangement for mounting the seal rotor to the shaft assembly utilizes virtually no axial space in the overall arrangement, is simple in configuration with a minimal number of component parts, and may be effectively functional in extreme environments due to the nonuse of elastomeric material.

Various alterations and modifications to the foregoing description of preferred arrangements of the invention will be apparent to those skilled in the art. The foregoing detailed specification should therefore be considered exemplary in nature and not as limiting to the scope and spirit of the invention as set forth in the appended claims.

Having described the invention with sufficient clarity that those skilled in the art may make and use it, what is claimed is:

1. A gas turbine engine having an axially extending, rotatable shaft; a stationary housing upon which the shaft is mounted to rotate; a first nonrotating, rigid seal member secured to the housing and having a flat, radially extending annular sealing face surrounding the shaft; a second rotatable, rigid seal member having a flat, radially extending annular sealing face; means for axially biasing said flat sealing faces of the first and second members into sealing contact; and an annular, axially thin, nonelastomeric foil affixed to and extending radially inwardly from said second member, said foil being axially clamped to said shaft to drive said second member to rotate with said shaft, said foil being sufficiently thin to distort upon clamping to substantially eliminate transmittal of clamping forces to said second member.

2. A gas turbine engine as set forth in claim 1, wherein the ratio of axial thicknesses of said second seal member and said foil is between about 15 and 20.

3. A gas turbine engine as set forth in claim 2, wherein said foil has an axial thickness of approximately 0.01 inches.

4. A gas turbine engine as set forth in claim 3, wherein said second seal member has an axial thickness of approximately 0.18 inches.

5. A gas turbine engine as set forth in claim 1, wherein said first seal member is of carbon material.

6. A gas turbine engine as set forth in claim 1, wherein said means for axially biasing comprises a spring member operably extending between said housing and said first seal member.

7. A gas turbine engine as set forth in claim 1, wherein said foil includes an unclamped portion extending radially between said second member and said shaft, the ratio of the radial length of said unclamped portion to the axial thickness of said foil is greater than about 6.

8. A gas turbine engine as set forth in claim 7, wherein said ratio is between about 6 and 10.

9. A gas turbine engine as set forth in claim 7, wherein said foil is of washer-like configuration having a radially outer portion affixed to said second seal member.

10. A gas turbine engine as set forth in claim 9, wherein said foil is located at approximately the axial mid-length of said second seal member and has opposed radial faces affixed to said second seal member.

11. A gas turbine engine as set forth in claim 1, wherein said foil is located at approximately the axial mid-length of said second seal member.

12. A gas turbine engine as set forth in claim 1, further including heat conductor means thermally associated with said second member for minimizing axial thermal gradients therein.

13. A gas turbine engine as set forth in claim 12, wherein said heat conductor means includes radially extending heat conduction fins on said second member for inducing thermal heat conduction radially from said second seal member.

14. A gas turbine engine as set forth in claim 1, wherein said foil and said member are of the same material.

15. A gas turbine engine as set forth in claim 14, wherein said foil and second member are steel.

16. In a gas turbine engine having a shaft mounted for rotation within a stationary housing, a shaft seal assembly comprising:
a nonrotating rigid seal ring carried on the housing in surrounding relation to the shaft, said nonrotating ring having a flat, annular end face;
a rotatable rigid seal ring spaced from and surrounding the shaft and having a flat, annular end face;
means for urging said end faces of the nonrotating and rotatable seal rings into sealing interengagement; and
a thin drive foil extending radially inwardly from said rotatable seal ring, said foil axially clamped to the shaft and being sufficiently compliant to substantially eliminate non-axisymmetric distortion to the rotatable seal ring end face as a result of clamping of the foil to the drive shaft.

17. A shaft seal for sealing between a rotary shaft and a stationary housing, comprising:
a first carbon seal ring secured to the stationary housing and having a radial flat sealing surface;
a rotatable second steel seal ring having a radial flat sealing surface;
means for axially urging said flat sealing surfaces of the first and second seal rings into sealing contact; and
a compliant, nonelastomeric annular drive ring rigidly affixed to and extending radially inwardly from said second seal ring and having a radial inward portion compressively clamped to said shaft, said drive ring being sufficiently compliant such that said inward portion yieldably deforms upon compressive clamping to said shaft to substantially eliminate non-axisymmetric distortion of said sealing surface of the rotatable seal as a result of the compressive clamping.

18. A shaft seal as set forth in claim 17, wherein said compliant annular drive ring is an axially thin, steel ring, the ratio of axial thickness of said second seal ring and said compliant annular drive ring being between about 15 and 20.

19. A shaft seal as set forth in claim 18, wherein said compliant annular drive ring includes a nonsecured portion extending radially between said shaft and said second seal ring, the ratio of radial length of said nonsecured portion to the axial thickness of said compliant annular drive ring being greater than about 6.

20. A shaft seal as set forth in claim 19, wherein said ratio of radial length of said nonsecured portion to the axial thickness of said compliant annular drive ring is between about 6 and 10.

* * * * *